United States Patent
Pendovski et al.

(10) Patent No.: US 9,863,310 B2
(45) Date of Patent: Jan. 9, 2018

(54) METHOD FOR MONITORING A TRACTION MECHANISM DRIVE OF AN INTERNAL COMBUSTION ENGINE, AND INTERNAL COMBUSTION ENGINE FOR CARRYING OUT A METHOD OF THIS TYPE

(71) Applicant: Ford Global Technologies, LLC, Dearborn, MI (US)

(72) Inventors: Denis Pendovski, Aachen (DE); David van Bebber, Aachen (DE); Hans Guenter Quix, Herzogenrath (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/178,944

(22) Filed: Jun. 10, 2016

(65) Prior Publication Data

US 2016/0363046 A1   Dec. 15, 2016

(30) Foreign Application Priority Data

Jun. 12, 2015 (DE) .................. 10 2015 210 859
Jun. 12, 2015 (DE) .................. 10 2015 210 861

(51) Int. Cl.
| | |
|---|---|
| *F16H 7/08* | (2006.01) |
| *F16H 7/22* | (2006.01) |
| *F02B 67/06* | (2006.01) |
| *F16H 7/12* | (2006.01) |

(52) U.S. Cl.
CPC ............... *F02B 67/06* (2013.01); *F16H 7/08* (2013.01); *F16H 7/12* (2013.01); *F16H 2007/0861* (2013.01)

(58) Field of Classification Search
CPC ........... F16H 7/1281; F16H 2007/0861; F16H 2007/0885; F02B 67/06; F01L 1/024
USPC .................................................. 474/101, 102
See application file for complete search history.

(56) References Cited

U.S. PATENT DOCUMENTS

| | | | | |
|---|---|---|---|---|
| 2,087,335 A | * | 7/1937 | Seeley .................... | G01B 5/043 |
| | | | | 33/743 |
| 4,332,087 A | * | 6/1982 | Ellis ......................... | G01B 3/02 |
| | | | | 33/759 |
| 4,348,811 A | * | 9/1982 | Brand ...................... | G01B 7/02 |
| | | | | 101/27 |
| 4,478,595 A | * | 10/1984 | Hayakawa ............ | F02B 77/081 |
| | | | | 474/109 |

(Continued)

*Primary Examiner* — Henry Liu
(74) *Attorney, Agent, or Firm* — Greg Brown; McCoy Russell LLP

(57) ABSTRACT

Systems and methods are provided for determining the length of a traction mechanism that is part of a traction drive of an engine. In one example, a method includes determining a position of a movable tensioning device relative to a traction mechanism drive using measuring technology, determining an actual length $L_{AS'}$ of a traction mechanism computationally using the position of the tensioning device, determining a length change $\Delta L$ with respect to a predefinable setpoint length $L_{AS}$ computationally using the computationally determined actual length $L_{AS'}$, and adjusting one or more operating parameters based on the length change.

15 Claims, 4 Drawing Sheets

(56) References Cited

U.S. PATENT DOCUMENTS

| | | | | |
|---|---|---|---|---|
| 4,715,333 A * | 12/1987 | Oyaizu | F01L 1/02 123/90.27 |
| 5,752,891 A * | 5/1998 | Meckstroth | F02B 67/06 474/110 |
| 6,666,784 B1 * | 12/2003 | Iwamoto | F01L 1/024 137/554 |
| 6,746,352 B1 * | 6/2004 | Poiret | F01L 1/02 474/101 |
| 6,834,228 B2 * | 12/2004 | Serkh | F02B 67/06 123/195 A |
| 6,877,467 B2 * | 4/2005 | Katayama | F01L 1/02 123/90.17 |
| 6,953,407 B2 * | 10/2005 | Kitamura | F02B 67/06 474/109 |
| 7,033,293 B2 * | 4/2006 | Serkh | F16H 55/54 474/54 |
| 7,086,373 B2 * | 8/2006 | Serkh | F01L 1/024 123/195 A |
| 7,188,021 B2 * | 3/2007 | Spicer | F02D 41/009 701/103 |
| 7,214,153 B2 * | 5/2007 | Simpson | F01L 1/02 123/90.17 |
| 7,228,829 B1 * | 6/2007 | Louie | F01L 1/02 123/90.15 |
| 7,699,732 B2 * | 4/2010 | Message | F16H 7/1281 474/106 |
| 7,869,729 B2 * | 1/2011 | Hachisuka | G03G 15/2039 399/329 |
| 8,495,978 B2 * | 7/2013 | Grossman | F16H 7/023 123/90.27 |
| 8,506,435 B2 * | 8/2013 | Geraghty | F16H 7/14 474/101 |
| 9,052,248 B2 * | 6/2015 | Shingai | B29D 29/00 |
| 9,303,713 B2 * | 4/2016 | Ehre | F16F 9/0218 |
| 9,334,932 B2 * | 5/2016 | Antchak | F16H 7/1263 |
| 9,447,850 B2 * | 9/2016 | Farewell | F02B 67/06 |
| 9,464,697 B2 * | 10/2016 | Antchak | F02B 67/06 |
| 9,599,199 B2 * | 3/2017 | Graves | F02B 67/06 |
| 2002/0128099 A1 * | 9/2002 | Winklhofer | F01L 1/02 474/102 |
| 2003/0083803 A1 * | 5/2003 | Serkh | F02B 67/06 701/115 |
| 2003/0087713 A1 * | 5/2003 | Todd | F16H 7/0829 474/111 |
| 2004/0038763 A1 * | 2/2004 | Serkh | F16H 55/54 474/54 |
| 2004/0063529 A1 * | 4/2004 | Mare | F16H 7/14 474/109 |
| 2005/0014586 A1 * | 1/2005 | Simpson | F01L 1/02 474/101 |
| 2005/0109299 A1 * | 5/2005 | Takahashi | F01L 1/02 123/90.17 |
| 2005/0124447 A1 * | 6/2005 | Message | F16H 7/1281 474/135 |
| 2005/0192142 A1 * | 9/2005 | Stone | F01L 1/024 474/101 |
| 2005/0192144 A1 * | 9/2005 | Yokoyama | F16H 7/1281 474/117 |
| 2005/0209034 A1 * | 9/2005 | Ellsworth | G01L 5/102 474/101 |
| 2005/0282668 A1 * | 12/2005 | Ali | F16H 7/1218 474/101 |
| 2006/0240922 A1 * | 10/2006 | Pendergrass | F16H 7/1281 474/102 |
| 2006/0276284 A1 * | 12/2006 | Lancaster | F02B 67/06 474/110 |
| 2009/0156340 A1 * | 6/2009 | Seo | F16H 7/1281 474/113 |
| 2009/0195203 A1 * | 8/2009 | Yurgil | B60K 6/485 318/452 |
| 2010/0102783 A1 * | 4/2010 | McDonald | B60W 10/30 322/23 |
| 2010/0137083 A1 * | 6/2010 | Carlson | F16H 7/1218 474/110 |
| 2011/0081996 A1 * | 4/2011 | Geraghty | F16H 7/14 474/101 |
| 2011/0312454 A1 * | 12/2011 | Comsa | F01L 1/02 474/110 |
| 2012/0065009 A1 * | 3/2012 | Mueller | F02B 67/06 474/101 |
| 2012/0088617 A1 * | 4/2012 | Suchecki | F01L 1/022 474/101 |
| 2012/0158226 A1 * | 6/2012 | Prucka | B60K 6/485 701/22 |
| 2014/0309882 A1 * | 10/2014 | Antchak | F02B 67/06 701/36 |
| 2016/0368139 A1 * | 12/2016 | Edsinger | F16H 7/02 |

* cited by examiner

METHOD FOR MONITORING A TRACTION MECHANISM DRIVE OF AN INTERNAL COMBUSTION ENGINE, AND INTERNAL COMBUSTION ENGINE FOR CARRYING OUT A METHOD OF THIS TYPE

CROSS REFERENCE TO RELATED APPLICATIONS

This application claims priority to German Patent Application Nos. 102015210861.9 and 102015210859.7, both filed Jun. 12, 2015, the entire contents of each of which are hereby incorporated by reference for all purposes.

FIELD

The invention relates to a method for monitoring a traction mechanism drive of an internal combustion engine with a crankshaft.

BACKGROUND/SUMMARY

A traction mechanism drive is used, for example, in a motor vehicle. Here, part of the power which is obtained in the internal combustion engine by way of the chemical conversion of the fuel is utilized to drive the auxiliary assemblies which are utilized for the operation of the internal combustion engine and the motor vehicle, in particular the injection pump (e.g., fuel injection pump), the oil pump, the coolant pump, the generator and the like or the camshafts of a valve gear which are required for the control of the valves.

Belt drives or chain drives are used for the drive, and the various drive mechanisms, such as belt and chain, being combined under the general term of traction mechanism in the context of the present invention, that is to say being subsumed under the superordinate term of traction mechanism. A traction mechanism is therefore also spoken of generally in the following text.

With as low energy losses as possible and with as little maintenance outlay as possible as a result of retensioning, the traction mechanism drive is intended to transmit a great torque from the crankshaft to the auxiliary assemblies, in particular the camshafts and the injection pump. Here, the drive of a plurality of auxiliary assemblies is frequently combined in one traction mechanism drive.

In order to keep the traction mechanism tensioned and therefore to ensure a drive which is as reliable and wear-free as possible, a tensioning device is provided at a suitable location of the traction mechanism drive, which tensioning device loads the traction mechanism with a force by way of engagement transversely with respect to the running direction, with the result that the traction mechanism is always under tension and is always kept under tension. This is indispensable for the reliable transmission of a sufficiently great torque or drive moment, in particular in order to avoid slip of the traction mechanism, that is to say, in particular, in order to ensure a slip-free drive.

Slip of the traction mechanism can also be avoided by the fact that positively locking traction mechanisms are used, that is to say chains or toothed belts; a tensioning device is also to be provided if positively locking traction mechanisms are used, in order to reliably prevent the traction mechanism from jumping over the externally toothed wheels of the traction mechanism drive.

The wear of the traction mechanism is a continuous process which is made discernible, inter alia, by the fact that the length of the traction mechanism increases continuously. A tensioning device of the described type reacts constantly during operation to said wear-induced length change of the traction mechanism and continues to keep the traction mechanism under tension despite the length change.

Tensioning devices of the described type make it possible to dispense with the retensioning in the context of maintenance measures, for example an inspection, for which reason the servicing intervals can be increased. For example, German laid-open specification DE 10 2007 025 731 A1 describes a method for detecting an elongation of an endless chain of a chain drive. German laid-open specification DE 10 2014 009 509 A1 describes a method for determining a crack, that is to say a break in a belt.

Nevertheless, the inventors herein have recognized that there are further aspects and effects which have to be taken into consideration in conjunction with the use of traction mechanism drives in internal combustion engines.

As a consequence of the wear-induced length change ΔL of the traction mechanism, the position of the wheels of the traction mechanism drive changes relative to one another, in particular the position of the driven wheels relative to the driving wheel. A driven wheel rotates with respect to the driving wheel by a rotational angle $\sigma_i$, while the traction mechanism is experiencing the wear-induced length change.

The rotation or the positional change by the rotational angle $\sigma_i$ has very different consequences, in a manner which is dependent on the relevant auxiliary assembly, on the shaft of which the rotated driven wheel is arranged.

If the relevant auxiliary assembly is the mechanical injection pump of the internal combustion engine, the rotation of the driven wheel which is arranged on the shaft of the injection pump and via which the injection pump is driven leads to a change in the injection parameters, in particular the injection start in ° CA. That is to say, the crankshaft and therefore the pistons which oscillate in the cylinders of the internal combustion engine no longer run synchronously with the injection pump, but rather have an undesired phase difference with respect to the injection pump and therefore with respect to the injections generated by the injection pump. This can result in disadvantages with regard to the fuel consumption and the pollutant emissions.

If the relevant auxiliary assembly is a valve gear of the internal combustion engine, the rotation of the driven wheel which is arranged on a camshaft of the valve gear and via which the camshaft is driven and is set in rotation leads to a change in the control times in ° CA. That is to say, the crankshaft and therefore the pistons which oscillate in the cylinders of the internal combustion engine no longer run synchronously with the valve gear, but rather have an undesired phase difference with respect to the valve gear and therefore with respect to the valves which are actuated by the valve gear. Disadvantages of a very different type can occur during the charge exchange, for example impaired residual gas flushing or a reduced degree of filling. In the individual case, in particular in highly compressing engines, the valves which open into the cylinder during the charge exchange can make contact with the piston, that is to say can collide with the piston which is running through the top dead center, as a result of which the functional operability of the valve gear and ultimately of the internal combustion engine can be endangered.

To this extent, it may be insufficient to react to a wear-induced length change by way of a tensioning device which merely continues to keep the traction mechanism under tension despite a length change.

Rather, the inventors herein have recognized that a method may be used by way of which the length change of the traction mechanism is monitored, in order to intervene in the case of a threshold length change which can be determined also by way of a threshold rotational angle $\sigma_i$ of a driven wheel, optionally by way of replacement of the traction mechanism. A determined length change can also be evaluated as an indicator for an imminent crack or fracture of the traction mechanism; degradation of the traction mechanism as a result of such a crack or fracture is to be avoided under all circumstances.

Thus, the inventors herein propose a method for monitoring a traction mechanism drive of an internal combustion engine with a crankshaft, which traction mechanism drive comprises, in addition to the traction mechanism, a first driving wheel which is arranged on the crankshaft and at least one further, second driven wheel which is arranged on a shaft of an auxiliary assembly, the traction mechanism being guided around the driving first wheel and the at least one further second driven wheel, and a movable tensioning device being provided, engages in a force-loaded manner into the traction mechanism, and loads the traction mechanism with tensile forces along its longitudinal axis for the purpose of tensioning. The method includes determining the position of the movable tensioning device relative to the traction mechanism drive using measuring technology, determining an actual length $L_{AS'}$ of the traction mechanism computationally using the position of the tensioning device which was determined using measuring technology, and determining a length change $\Delta L$ with respect to a predefinable setpoint length $L_{AS}$ computationally using the computationally determined actual length $L_{AS'}$.

In this way, not only can an elongation of the traction mechanism be recognized, that is to say detected, by way of the method according to the disclosure, but also a method for monitoring a traction mechanism drive is indicated, by way of which the wear-induced length change $\Delta L$ of the traction mechanism can be computationally determined continuously.

According to the disclosure, the position of the movable tensioning device relative to the traction mechanism drive is determined using measuring technology in order to computationally determine the wear-induced length change $\Delta L$ of the traction mechanism. The awareness of the instantaneous position of the tensioning device together with the knowledge about the kinematics of the traction mechanism drive, in particular the known diameters and the known arrangement of the wheels with respect to one another, allows the actual length of the traction mechanism to be calculated. A comparison of the actual length of the traction mechanism with the setpoint length of the traction mechanism, for example the length of a new traction mechanism or of a traction mechanism which is newly mounted and tensioned in the traction mechanism drive, leads to the relevant length change which is of interest in the present case.

According to the disclosure, the computationally determined length change $\Delta L$ of the traction mechanism can be used, furthermore, to determine the rotational angle $\sigma_i$ of a driven wheel with respect to the driving wheel. Said rotational angle $\sigma_i$ can in turn be used according to the disclosure to influence the relevant auxiliary assemblies, for example by changing or adapting control operation, or can be used for a different type of reaction.

In another example, the instantaneous state of the traction mechanism, for example a wear-induced length change, can be monitored and/or a crack in the traction mechanism can be detected. To monitor the instantaneous state, a vibration behavior of the traction mechanism is detected metrologically, and the metrologically detected vibration behavior of the traction mechanism is evaluated using an evaluation device, in such a way that a statement is made about the state of the traction mechanism.

The method according to the disclosure for monitoring a traction mechanism drive utilizes the circumstance that both the driving crankshaft and the driven auxiliary assemblies, for example a driven valve gear, are dynamic, vibratory systems.

Together with the coupled engine parts, the crankshaft forms a vibratory system. Here, the crankshaft is excited to perform torsional vibrations by way of the torsional forces which change over time and are introduced into the crankshaft via the connecting rods which are articulated on the individual crank pins. The torsional vibrations of the crankshaft are transmitted in an undesired manner to the traction mechanism and the traction mechanism drive and therefore also to the auxiliary assemblies, for example a valve gear with associated camshaft, the camshaft itself also representing a vibratory system. The rotating camshaft is thus loaded with a torque counter to its rotational direction when the cam moves the valve in the direction of the valve open position counter to the prestressing force of a valve spring, whereas, during the closing operation when the valve is pressed in the direction of the valve closed position by the valve spring, the camshaft is loaded via the cam with an additional torque in the direction of the camshaft rotation. The torsional vibrations of the camshaft in turn influence the crankshaft or the crankshaft torsional vibration.

The method according to the disclosure for monitoring a traction mechanism drive then utilizes the circumstance that the traction mechanism per se is likewise a vibratory system or a system which vibrates during operation of the internal combustion engine and is excited to perform different vibrations.

It is utilized here according to the disclosure that the vibration behavior of the traction mechanism additionally and in a particular way depends on the state of the traction mechanism. In particular, the method according to the disclosure proceeds from the finding that a wear-induced length change in the traction mechanism or a defect of the traction mechanism has an influence on the vibration behavior and, as a consequence, leads to a change in the vibration behavior which can be detected metrologically.

The metrologically detected vibration behavior of the traction mechanism is evaluated using an evaluation device, in such a way that, proceeding from the vibration behavior, a conclusion is made about the state of the traction mechanism.

The engine controller of the internal combustion engine can serve as evaluation device. The metrologically detected vibration behavior of the traction mechanism is used as an input signal, and the state of the traction mechanism represents the output signal. Tables, characteristic maps, look-up tables and/or the like which are generated empirically on the test bench can be stored in the evaluation device, which tables, maps and the like assign a specific state of the traction mechanism, for example an instantaneous length, a length change, wear, remaining service life and/or the like to a defined vibration behavior of the traction mechanism.

A comparison of the actual length of the traction mechanism with the setpoint length of the traction mechanism, for example the length of a new traction mechanism or of a traction mechanism which is newly mounted and tensioned in the traction mechanism drive, leads to the relevant length change which is of interest in the present case. The length change ΔL of the traction mechanism can be used further.

In the individual case, a conclusion about the rotational angle $\sigma_i$ of a driven wheel with respect to the driving wheel can be made on the basis of a wear-induced length change ΔL of the traction mechanism. Said rotational angle $\sigma_i$ in turn can be used to influence the relevant auxiliary assemblies. The kinematics of the traction mechanism drive are known, in particular the diameters and the arrangement of the wheels with respect to one another.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
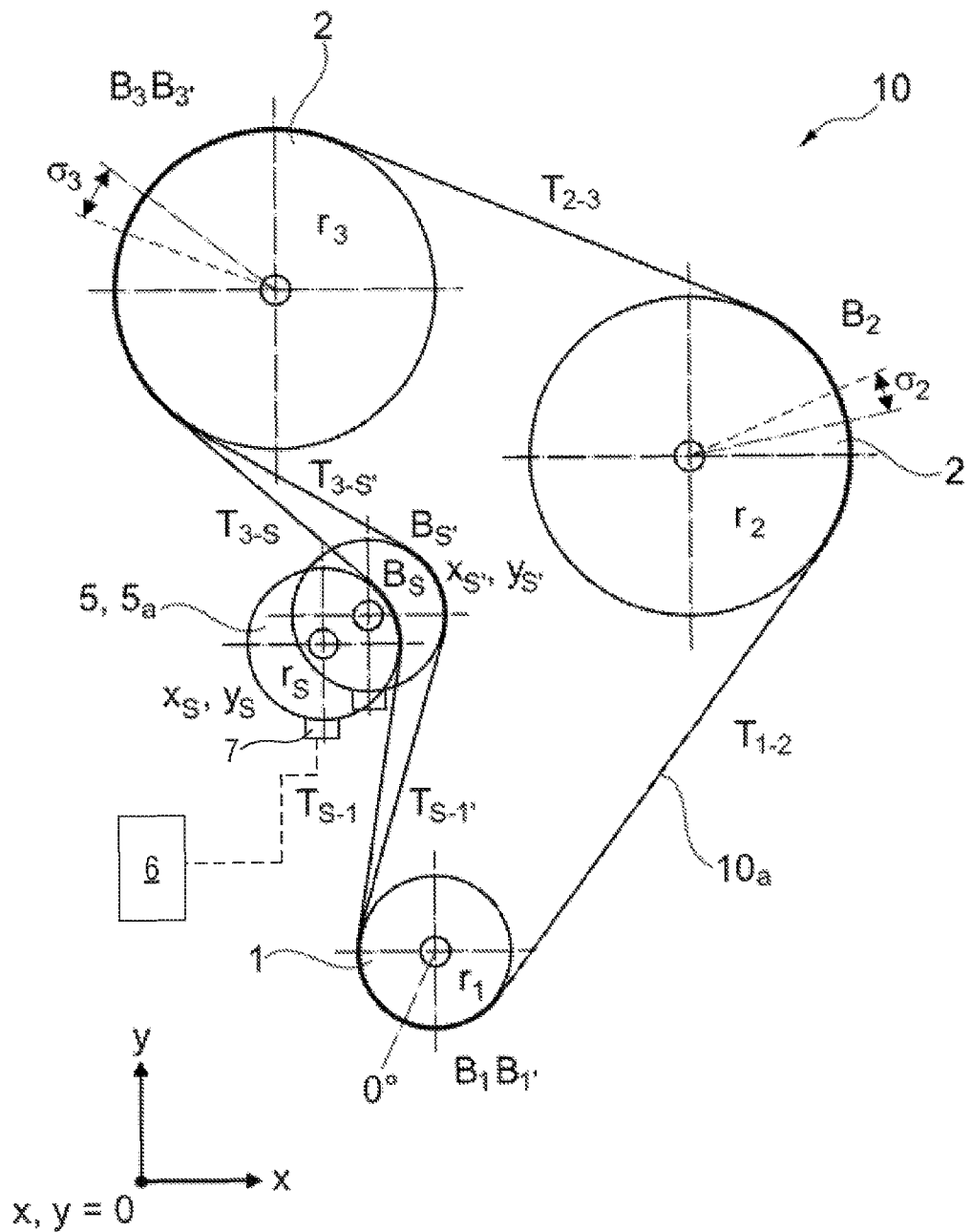
FIG. 1 diagrammatically shows the traction mechanism drive of a first embodiment of the internal combustion engine.

In engine systems, the timing chain or the toothed belt has a significant importance for the operation of the engine, as the chain or belt may control the valve timing and is relevant for a quiet, fuel-efficient and safe operation of the engine. However, over time the chain or belt may become elongated and jump off the drive system, leading to engine degradation. Typically, chain or belt elongation is detected during service of the engine, and thus maintenance intervals are kept as small as possible so that a visual inspection may be carried out. Such frequent maintenance intervals may be costly and inconvenient for an operator.

According to embodiments disclosed herein, the length of the chain or belt (referred to herein as the traction mechanism) may be determined automatically based on the position of the tensioner used to maintain desired traction mechanism tension. In one example, a tension roller may include a sensor which measures the position of the tension roller and outputs a signal once a threshold length is reached. Another possibility is to provide the tension roller with a switch, which indicates a signal when touched (e.g., when the tensioner moves to such a position to provide contact with the switch). The advantages of the sensor are that in addition to the position of the tensioner, the oscillation frequency can be detected. Thus, statements about the smoothness of the engine would be possible or it can also be detected material changes in the timing chain or timing belt, which indicate increased wear or fatigue.

Embodiments of the method are provided, in which the position of the movable tensioning device relative to the traction mechanism drive is determined in a contactless manner. A contactless determination of the instantaneous tensioning device position eliminates the risk of disrupting the operation of the circulating traction mechanism drive.

Embodiments of the method are advantageous, in which the position of the movable tensioning device relative to the traction mechanism drive is determined using an electromagnetic sensor. An electromagnetic sensor of this type can comprise a magnet and a coil, a signal being generated by way of the movement or arrangement of the coil and the magnet with respect to one another, which signal allows the position of the movable tensioning device to be determined. The position can be specified and fixed clearly in a two-dimensional x-y coordinate system by way of a value pair (x, y).

Embodiments of the method are advantageous, in which a rotational angle $\sigma_2$ of the second driven wheel is determined computationally using the position of the tensioning device (which was determined using measuring technology) and the computationally determined length change ΔL, said rotational angle $\sigma_2$ fixing a length change and specifying an angle the second driven wheel has rotated with respect to the first driving wheel when the traction mechanism drive is at a standstill, while the traction mechanism has experienced the length change ΔL.

In order to monitor a traction mechanism drive which comprises a third driven wheel which is arranged on a shaft of a further auxiliary assembly, method variants are provided, in which a rotational angle $\sigma_3$ of the third driven wheel is determined computationally using the position of the tensioning device and the computationally determined length change ΔL, said rotational angle $\sigma_3$ fixing a length change and specifying an angle the third driven wheel has rotated with respect to the first driving wheel when the traction mechanism drive is at a standstill, while the traction mechanism has experienced the length change ΔL.

In order to monitor a traction mechanism drive which comprises a fourth driven wheel which is arranged on a shaft of a further auxiliary assembly, method variants are provided, in which a rotational angle $\sigma_4$ of the fourth driven wheel is determined computationally using the position of the tensioning device and the computationally determined length change ΔL, said rotational angle $\sigma_4$ fixing a length change and specifying an angle the fourth driven wheel has rotated with respect to the first driving wheel when the traction mechanism drive is at a standstill, while the traction mechanism has experienced the length change ΔL.

Embodiments of the method are provided, in which an injection pump is used as an auxiliary assembly or a further auxiliary assembly, on the shaft of which a driven wheel is arranged.

Embodiments of the method are provided, in which an injection pump is used as an auxiliary assembly or as a further auxiliary assembly, on the shaft of which a driven wheel is arranged, and the computationally determined rotational angle $\sigma_i$ of the driven wheel is used, in order to control the injection pump.

In this context, embodiments of the method are provided, in which the computationally determined rotational angle $\sigma_i$ of the driven wheel is used, in order to adapt an injection start and/or an injection duration of an injection which is to be carried out by the injection pump.

Embodiments of the method are provided, in which a valve gear which comprises at least one camshaft, on which a driven wheel is arranged, is used as an auxiliary assembly or as a further auxiliary assembly.

What has already been stated for the method according to the disclosure described above also applies to the internal combustion engine according to the disclosure, for which reason reference is made generally at this point to the comments made in the above text with regard to the method according to the disclosure. The different method variants described above may utilize partially different internal combustion engines.

Embodiments of the internal combustion engine are provided, in which the tensioning device is a linearly movable tensioning device. Embodiments of the internal combustion engine can also be provided, in which the tensioning device is a tensioning device which can be moved on a circular arc. Here, embodiments of the internal combustion engine are provided, in which the tensioning device comprises a rotatably mounted lever which serves to receive the tensioning device (e.g., the tensioning device is received by the rotatably mounted lever, where the tensioning device is movable in a circular arc).

Embodiments of the internal combustion engine are provided, in which the tensioning device is a rotatably mounted roller. The relative speed between the roller and the traction mechanism when the traction mechanism drive is circulating is ideally equal to zero.

Embodiments of the internal combustion engine can also be provided, in which the tensioning device is a tensioning element of bar-shaped configuration.

Embodiments of the internal combustion engine are in principle provided, in which the tensioning device also serves as a guide device for the traction mechanism. The tensioning device then has a double function of such a type that it guides the traction mechanism and at the same time loads it with a transverse force. To this end, the tensioning device can be of modular construction, that is to say can comprise separate guide means, but can also be of single-piece configuration.

Embodiments of the internal combustion engine are provided, in which the traction mechanism is a chain. Embodiments of the internal combustion engine can also be provided, in which the traction mechanism is a belt, in particular a toothed belt. Embodiments of the internal combustion engine are provided, in which the traction mechanism is a positively locking traction mechanism. A positively locking traction mechanism such as a chain or a toothed belt ensures slip-free operation of the traction mechanism drive; unlike, for example, a conventional V-belt which transmits torque in a non-positive manner by means of friction.

An internal combustion engine of the stated type is used as a motor vehicle drive. In the context of the present invention, the term internal combustion engine comprises diesel engines and Otto engines, but also hybrid internal combustion engines which utilize a hybrid combustion process, and hybrid drives which, in addition to the internal combustion engine, comprise an electric machine which can be drive-connected to the internal combustion engine and receives power from the internal combustion engine or outputs power additionally as a switchable auxiliary drive.

FIG. 1 diagrammatically shows the traction mechanism drive 10 of an embodiment of the internal combustion engine, to be precise with the traction mechanism 10a in two different lengths $L_{AS'}$, $L_{AS}$.

In addition to the traction mechanism 10a, the traction mechanism drive 10 comprises a first driving wheel 1 which is arranged on the crankshaft, and two further wheels 2, 3, namely a second driven wheel 2 which is arranged on a shaft of an injection pump, and a third driven wheel 3 which is arranged on the camshaft of a valve gear.

The traction mechanism 10a is guided around the driving first wheel 1 and the two driven wheels 2, 3 and is tensioned by a tensioning device, that is to say is held tensioned. In the present case, the tensioning device has a rotatable tensioning roller 5a as movable tensioning device 5. The tensioning roller 5a can be displaced linearly and is therefore movable and is force-loaded by a spring in such a way that the tensioning roller 5a engages into the traction mechanism 10a and loads the traction mechanism 10a with tensile forces along its longitudinal axis for the purpose of tensioning.

The position of the movable tensioning roller 5a relative to the traction mechanism drive 10 is determined using measuring technology (not shown). Using the position of the tensioning roller 5a which was determined using measuring technology, the actual length $L_{AS'}$ of the traction mechanism 10a and therefore a length change $\Delta L$ with respect to a predefinable setpoint length $L_{AS}$ can be determined computationally.

A sensor 7, an acceleration sensor in the present case, is provided for metrological detection of the vibration behavior of the traction mechanism 10a, which sensor 7 is arranged on and fastened to the tensioning roller 5a and indirectly detects the vibration behavior of the traction mechanism 10a.

An evaluation device 6 serves to assess the state of the traction mechanism 10a using the metrologically determined vibration behavior of the traction mechanism 10a.

Regarding the determination of the vibration behavior, embodiments of the method are provided in which the vibration behavior of the traction mechanism is detected metrologically, by the frequency of the vibration of the traction mechanism being detected metrologically. Embodiments of the method are provided, in which the vibration behavior of the traction mechanism is detected metrologically, by the amplitude of the vibration of the traction mechanism being detected metrologically.

Embodiments of the method are provided, in which the vibration behavior of the traction mechanism is detected metrologically, by the frequency of the vibration of the traction mechanism and the amplitude of the vibration of the traction mechanism being detected metrologically.

Embodiments of the method are provided, in which the vibration behavior of the traction mechanism is detected metrologically by an acceleration sensor. The acceleration sensor is preferably fastened to the tensioning device, the tensioning device acting as a sensor or vibration transmitter. The vibration behavior of the traction mechanism is then detected indirectly, namely via the tensioning device.

Embodiments of the method are provided, in which degradation of the traction mechanism can be detected using the evaluation device. In this context, embodiments of the method are provided, in which a crack in the traction mechanism can be detected using the evaluation device. A vibration behavior cannot be determined any longer in the case of a cracked traction mechanism.

Embodiments of the method are provided, in which an actual length LAS' of the traction mechanism is determined using the evaluation device, and a length change $\Delta L$ with respect to a predefinable setpoint length LAS is determined computationally using the actual length LAS'.

A rotational angle σ2 of the second driven wheel can be determined computationally using the length change $\Delta L$ and the knowledge about the kinematics of the traction mechanism drive, said rotational angle σ2 fixing a length change and specifying an angle the second driven wheel has rotated with respect to the first driving wheel when the traction mechanism drive is at a standstill, while the traction mechanism has experienced the length change $\Delta L$.

A defined length change can also be evaluated as an indication for an imminent crack or fracture of the traction mechanism; a degradation of the traction mechanism as a result of crack or fracture is to be avoided to the extent possible.

If the traction mechanism drive comprises a third driven wheel which is arranged on a shaft of a further auxiliary assembly, a rotational angle σ3 of the third driven wheel can be determined computationally using the length change ΔL and the knowledge about the kinematics of the traction mechanism drive, said rotational angle σ3 fixing a length change and specifying an angle the third driven wheel has rotated with respect to the first driving wheel when the traction mechanism drive is at a standstill, while the traction mechanism has experienced the length change ΔL.

An internal combustion engine, such as the engine described above, may include at least one sensor for metrological detection of the vibration behavior of the traction mechanism, and an evaluation device is provided for assessment of the state of the traction mechanism using the metrologically detected vibration behavior of the traction mechanism.

What has already been stated for the method according to the disclosure for detection of the vibration behavior also applies to the internal combustion engine according to the disclosure, for which reason reference is made generally at this point to the comments made in the above text with regard to the method according to the disclosure.

Embodiments of the internal combustion engine are provided, in which the at least one sensor for metrological detection of the vibration behavior of the traction mechanism is an acceleration sensor. Embodiments of the internal combustion engine are provided, in which the at least one sensor for metrological detection of the vibration behavior of the traction mechanism is arranged on and fastened to the tensioning device.

In internal combustion engines with an engine controller, embodiments are provided, in which the engine controller serves as an evaluation device which supplies an output signal relating to the state of the traction mechanism using the metrologically detected vibration behavior of the traction mechanism as an input signal.

In the following text, the formulae for calculating the length change ΔL of the traction mechanism and the rotational angle $\sigma_2$ and $\sigma_3$ are specified. The characters which are used relate to the designations which are specified in FIG. 1.

The lengths $L_{AS}$ and $L_{AS'}$ of the traction mechanism 10a result from the individual run lengths $T_i$ and the circular arcs $B_i$ and therefore also the length change ΔL of the traction mechanism 10a.

$$L_{AS}=T_{1-2}+T_{2-3}+T_{3-S}+T_{S-1}+B_1+B_2+B_3+B_S$$

$$L_{AS'}=T_{1-2}+T_{2-3}+T_{3-S}+T_{S-1}+B_{1'}+B_{2'}+B_{3'}+B_{S'}$$

$$\Delta L=L_{AS'}-L_{AS}$$

The rotational angles $\sigma_2$, $\sigma_3$ are as follows:

$$\sigma_2 = ((B1'/2 + T_{1-2} + B2/2) \cdot k\Delta L)/r_2$$

$$\sigma_3 = ((B1'/2 + T_{1-2} + B2 + T_{2-3} + B3'/2) \cdot k\Delta L)/r_3$$

$$k\Delta L = \frac{L_{AS'}}{L_{AS}} - 1$$

The following applies to the run lengths $T_i$:

$$T_{1-2}=Da_{1-2}\cdot(\cos \beta_{1-2})$$

$$T_{2-3}=Da_{2-3}\cdot(\cos \beta_{2-3})$$

$$T_{3-S}=Da_{3-S}\cdot(\cos \beta_{3-S})$$

$$T_{S-1}=Da_{S-1}\cdot(\cos \beta_{S-1})$$

and to the circular arcs $B_i$:

$$B_1=\alpha_1\cdot r_1$$

$$B_2=\alpha_2\cdot r_2$$

$$B_3=\alpha_3\cdot r_3$$

$$B_S=\alpha_S\cdot r_S$$

The axle spacings $D_a$ of the wheels among one another are calculated as follows:

$$Da_{1-2}=\sqrt{(x_1-x_2)^2+(y_1-y_2)^2}$$

$$Da_{2-3}=\sqrt{(x_2-x_3)^2+(y_2-y_3)^2}$$

$$Da_{3-S}=\sqrt{(x_3-xS)^2+(y_3-yS)^2}$$

$$Da_{S-1}=\sqrt{(xS-x_1)^2+(yS-y_1)^2}$$

with the equations for the wraparound angles $\alpha_i$:

$$\alpha_1=\pi-\beta_{1-2}-\gamma_{1-2}+\beta_{S-1}-\gamma_{S-1}$$

$$\alpha_2=\gamma_{2-3}+\beta_{1-2}+\gamma_{1-2}+/-\beta_{2-3}$$

$$\alpha_3=\pi-\gamma_{2-3}+\beta_{3-S}+\gamma_{3-S}+/-\beta_{2-3}$$

$$\alpha_S=\beta_{S-1}-\gamma_{S-1}+\beta_{3-S}+\gamma_{3-S}$$

and the other angles γ and β:

$$\gamma_{1-2}=\arctan((x2-x1)/(y2-y1))$$

$$\gamma_{2-3}=\arctan((x2-x3)/(y3-y2))$$

$$\gamma_{3-S}=\arctan((xS-x3)/(y3-yS))$$

$$\gamma_{S-1}=\arctan((x1-xS)/(yS-y1))$$

$$\beta_{1-2}=\arcsin((r2-r1)/Da_{1-2})$$

$$\beta_{2-3}=\arcsin((r3-r2)/Da_{2-3})$$

$$\beta_{3-S}=\arcsin((r3+rS)/Da_{3-S})$$

$$\beta_{S-1}=\arcsin((rS+r1)/Da_{S-1})$$

Figure 2:
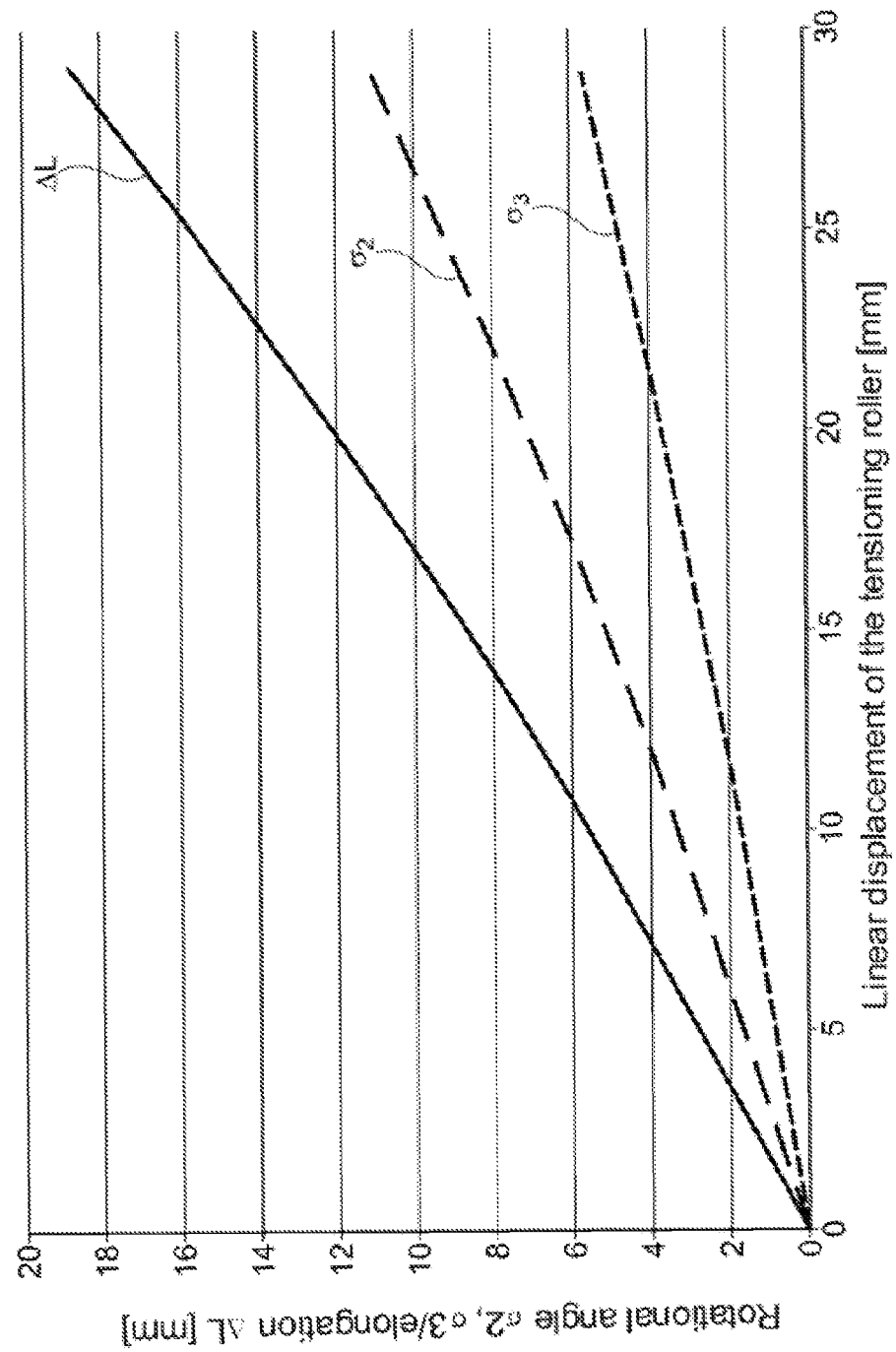
FIG. 2 shows the length change ΔL of the traction mechanism and the rotational angles σ2 and σ3 of the traction mechanism drive shown in FIG. 1 in a manner which is dependent on the linear displacement of the tensioning device.

FIG. 2 shows the length change ΔL of the traction mechanism and the rotational angles $\sigma_2$ and $\sigma_3$ of the traction mechanism drive shown in FIG. 1 in a manner dependent on the linear displacement of the tensioning roller. The rotational angles $\sigma_2$ and $\sigma_3$ likewise become greater as the length change ΔL increases.

Figure 3:
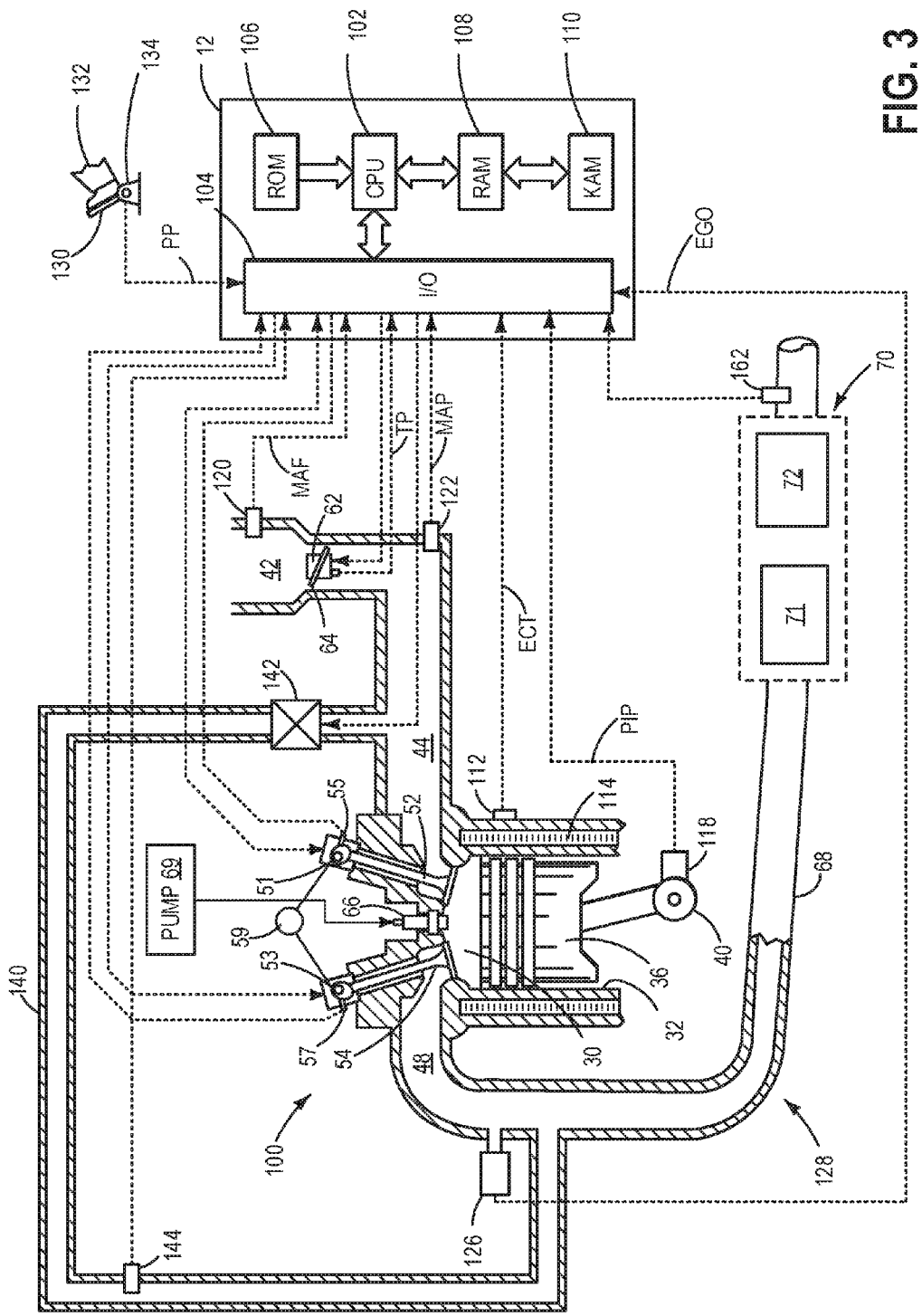
FIG. 3 schematically shows a cylinder of an engine.

Referring now to FIG. 3, it shows a schematic diagram with one cylinder of multi-cylinder engine 100, which may be included in a propulsion system of a vehicle. Traction drive 10 may be coupled to various components of engine 100, as described in more detail below. Engine 100 may be controlled at least partially by a control system including a controller 12 and by input from a vehicle operator 132 via an input device 130. In this example, input device 130 includes an accelerator pedal and a pedal position sensor 134 for generating a proportional pedal position signal PP. A combustion chamber 30 (also termed, cylinder 30) of the engine 100 may include combustion chamber walls 32 with a piston 36 positioned therein. Piston 36 may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to the crankshaft 40 via a flywheel (not shown) to enable a starting operation of the engine 100. Additionally, crankshaft 40 may be coupled to the driving wheel 1 of traction drive 10 of FIG. 1.

Combustion chamber 30 may receive intake air from an intake manifold 44 via an intake passage 42 and may exhaust combustion gases via an exhaust manifold 48 to exhaust passage 68. The intake manifold 44 and the exhaust manifold 48 can selectively communicate with the combustion chamber 30 via intake valve 52 and exhaust valve 54 respectively. In some embodiments, the combustion chamber 30 may include two or more intake valves and/or two or more exhaust valves.

In the example depicted in FIG. 3, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. In the example illustrated in FIG. 3, a camshaft 59 may control opening and closing of intake valve 52 and exhaust valve 54. Camshaft 59 may be coupled to one of the driven wheels 2, 3 of FIG. 1. The position of the intake valve 52 and the exhaust valve 54 may be determined by position sensors 55 and 57, respectively. In alternative embodiments, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

In some embodiments, each cylinder of the engine 100 may be configured with one or more fuel injectors for providing fuel thereto. As a non-limiting example, the cylinder 30 is shown including one fuel injector 66. Fuel injector 66 is shown coupled to the cylinder 30 for injecting fuel directly therein. In this manner, fuel injector 66 provides what is known as direct injection of fuel into combustion chamber 30. It will also be appreciated that the cylinder 30 may receive fuel from a plurality of injections during a combustion cycle. In other examples, the fuel injector may be mounted in the side of the combustion chamber or in the top of the combustion chamber, for example. Fuel may be delivered to fuel injector 66 by a fuel system including a fuel tank and an injection pump 69. Injection pump 69 may be coupled to one of the driven wheels 2, 3 of FIG. 1. In examples where both the camshaft and injector pump are driven by the engine via the traction drive, the camshaft may be coupled to driven wheel 2 and the injector pump may be coupled to driven wheel 3. The injection pump may include a cam ring which actuates a pump piston and is driven by a drive shaft of the injection pump (the drive shaft of the pump may be driven by the engine via the traction drive). The injection pump may include timer piston configured to adjust the cam ring in order to advance or retard fuel injection timing. The timer piston may be controlled based on signals from the controller in some examples. In other examples, fuel may be injected in proportion to a pulse width of signal FPW received from controller 12 via an electronic driver.

In one example, the engine 100 may be a diesel engine that combusts air and diesel fuel through compression ignition. In other non-limiting embodiments, the engine 100 may combust a different fuel including gasoline, biodiesel, or an alcohol containing fuel blend (e.g., gasoline and ethanol or gasoline and methanol) through compression ignition and/or spark ignition. Thus, the embodiments described herein may be used in any suitable engine, including but not limited to, diesel and gasoline compression ignition engines, spark ignition engines, direct or port injection engines, etc.

The intake passage 42 may include a throttle 62 having a throttle plate 64. In this particular example, the position of the throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by throttle position signal TP. The intake passage 42 may include a mass air flow sensor 120 and a manifold air pressure sensor 122 for providing respective signals MAF and MAP to the controller 12.

Further, in the disclosed embodiments, an exhaust gas recirculation (EGR) system may route a desired portion of exhaust gas from the exhaust passage 68 to the intake manifold 44 via an EGR passage 140. The amount of EGR provided may be varied by controller 12 via an EGR valve 142. By introducing exhaust gas to the engine 100, the amount of available oxygen for combustion is decreased, thereby reducing combustion flame temperatures and reducing the formation of NOx, for example. As depicted, the EGR system further includes an EGR sensor 144 which may be arranged within the EGR passage 140 and may provide an indication of one or more of pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

An exhaust system 128 includes an exhaust gas sensor 126 coupled to the exhaust manifold 48 upstream of an emission control system 70. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), NOx, HC, or CO sensor.

Emission control system 70 is shown arranged along exhaust passage 68 downstream of exhaust gas sensor 126. Emission control system 70 may be a selective catalytic reduction (SCR) system, three way catalyst (TWC), NOx trap, various other emission control devices, or combinations thereof. Emission control system 70 may further include exhaust gas sensor 162. Sensor 162 may be any suitable sensor for providing an indication of a concentration of exhaust gas constituents such as a NOx, NH3, etc. and may be an EGO or particulate matter (PM) sensor, for example. In some embodiments sensor 162 may be located downstream of DPF 72 (as shown in FIG. 1), while in other embodiments, sensor 162 may be positioned upstream of DPF 72 (not shown in FIG. 1). Further, it will be appreciated that more than one sensor 162 may be provided in any suitable position.

Controller 12 is shown in FIG. 3 as a microcomputer, including a microprocessor unit 102, input/output ports 104, an electronic storage medium for executable programs and calibration values shown as a read only memory chip 106 in this particular example, random access memory 108, keep alive memory 110, and a data bus. The evaluation device 6 of FIG. 1 may be incorporated into controller 12, may be in communication with controller 12, or may be a non-limiting example of controller 12. The controller 12 may be in communication with and, therefore, receive various signals from sensors coupled to the engine 100, in addition to those signals previously discussed, including measurement of inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to the crankshaft 40; throttle position (TP) from a throttle position sensor; absolute manifold pressure signal, MAP, from the sensor 122; and exhaust constituent concentration from the exhaust gas sensors 126 and 162. Engine speed signal, RPM, may be generated by controller 12 from signal PIP. Note that various combinations of the above sensors may be used, such as a MAF sensor without a MAP sensor, or vice versa. During stoichiometric operation, this sensor can give an indication of engine torque. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

The storage medium read-only memory 106 can be programmed with non-transitory, computer readable data representing instructions executable by the processor 102 for performing the routines described below as well as other variants that are anticipated but not specifically listed. Example routines are described herein with reference to FIG. 4.

As described above, FIG. 3 shows only one cylinder of a multi-cylinder engine, and each cylinder may similarly include its own set of intake/exhaust valves, fuel injector, etc.

Figure 4:
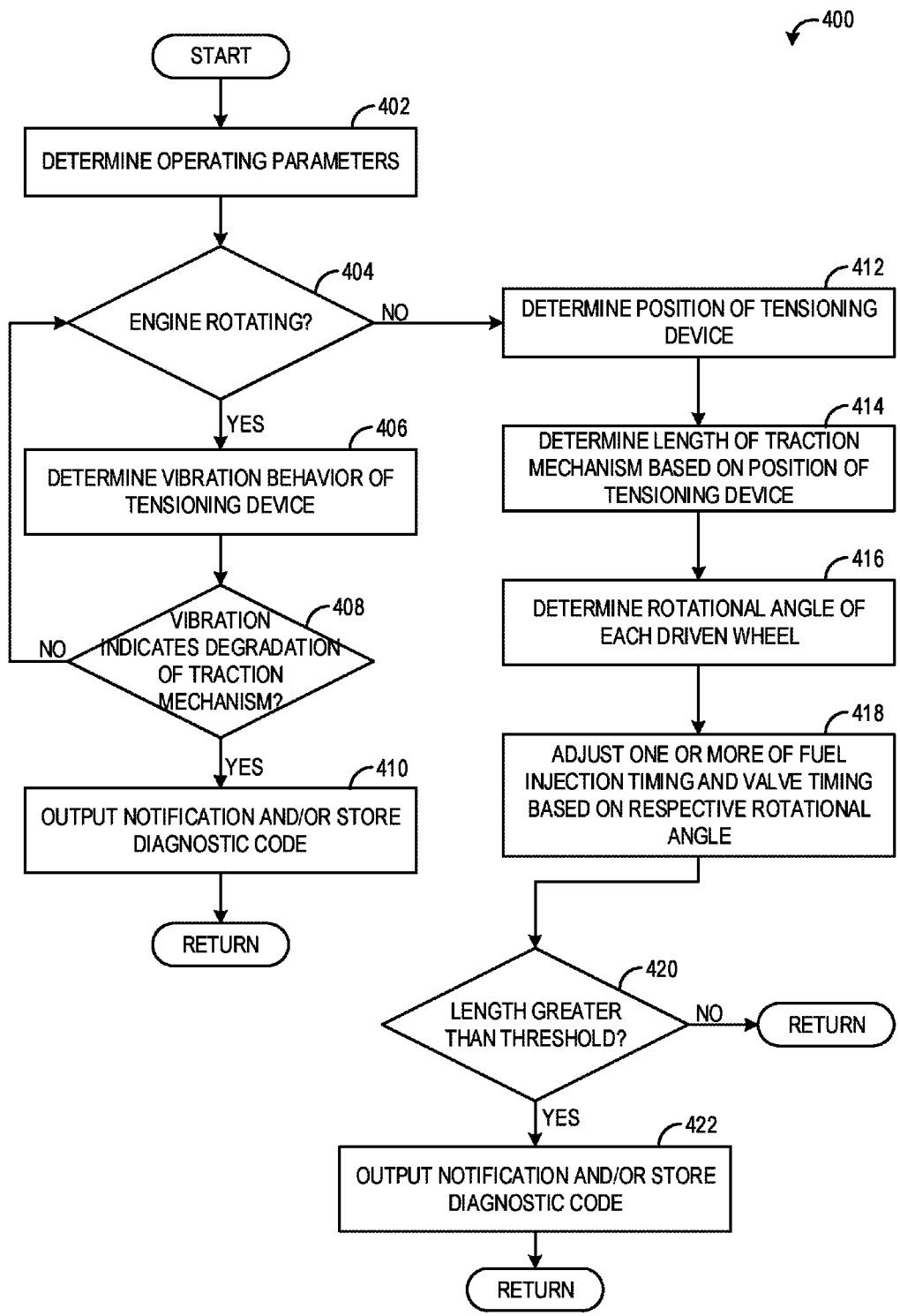
FIG. 4 is a flow chart illustrating a method for operating an engine.

Turning to FIG. 4, a method 400 for operating an engine is presented. Instructions for carrying out method 400 may be executed by a controller based on instructions stored on a memory of the controller and in conjunction with signals received from sensors of the engine system, such as the sensors described above with reference to FIGS. 1 and 3. The controller may employ engine actuators of the engine system to adjust engine operation, according to the methods described below. Method 400 may be carried out to control operation of engine 100 based on a length of the traction mechanism 10*a* and/or based on a vibrational behavior of the tensioning device 5.

At 402, method 400 includes determining operating parameters. The determined operating parameters may include but are not limited to engine speed, engine load, current or previously determined tensioning device position, and so forth. At 404, method 400 determines if the engine is rotating. If the engine is rotating, method 400 proceeds to 406 to determine the vibration behavior of a tensioning device, such as device 5 of FIG. 1, based on feedback from a sensor, such as an acceleration sensor, configured to measure oscillation of the tensioning device. At 408, method 400 determines if the vibration behavior indicates degradation of a traction mechanism. The vibration behavior may be indicative of traction mechanism degradation when the vibrations are different than those expected of a new, undegraded traction mechanism. In one example, the acceleration sensor may output a signal and the amplitude and/or phase of the signal may be analyzed to determine if the vibration behavior of the tensioning device indicates traction mechanism degradation. In examples, the signal from the acceleration sensor may be transformed into the frequency domain and a magnitude of a selected frequency component may be compared to a threshold to determine if the vibration behavior of the tensioning device is indicative of traction mechanism degradation.

If the vibration behavior indicates degradation, method 400 proceeds to 410 to output a notification to an operator, such as outputting a display element for display to the operator, of the degradation of the traction mechanism, to prompt the operator to seek maintenance of the traction mechanism, and/or set a diagnostic code. Method 400 then returns. If the vibration behavior does not indicate degradation, method 400 loops back to 404 and reassess if the engine is still rotating and/or continues to monitor the vibration behavior of the tensioning device. In some examples, the vibration behavior may be used to determine the vibration of the engine and various operating parameters may be adjusted in response to the engine vibrations, e.g., dampeners may be adjusted to reduce engine vibration.

Returning to 404, if it is determined that the engine is not rotating, method 400 proceeds to 412 to determine a position of the tensioning device. As explained above, a sensor, such as electromagnetic sensor, linear variable displacement transducer, or other sensor may determine the axial/lateral position of the tensioning device relative to other components of the traction drive (such as the driving wheel). In some examples, the sensor used to determine the position of the tensioning device may the same sensor used to determine the vibration behavior of the tensioning device. At 414, method 400 determines the length of the traction mechanism of the traction drive (e.g., the length of the belt or chain of the traction drive) based on the position of the tensioning device, as described above with respect to FIG. 1. At 416, the rotational angle of each driven wheel is determined based on the length of the traction mechanism, as described above with respect to FIG. 1. The rotational angle of each driven wheel may be the angle relative to a reference angle of the driving wheel and hence reflects a phase shift of each driven wheel relative to the driving wheel caused by the lengthening of the traction mechanism.

At 418, method 400 includes adjusting one or more of fuel injection timing and valve timing based on a respective rotational angle. In one example, an injection pump may be driven by a first driven wheel, and thus the fuel injection timing may be adjusted based on the rotational angle of the first driven wheel. A camshaft may be driven by a second driven wheel, and thus the valve timing may be adjusted based on the rotational angle of the second driven wheel. To adjust the injection timing, a timing piston of the injection pump may be adjusted by controlling the PWM of a solenoid of the injection pump to advance or retard fuel injection timing. In this way, even as the length of the traction mechanism increases and hence the phase of rotation of the injection pump shifts relative to the driving wheel (and hence engine), desired fuel injection timing may be maintained. To adjust the valve timing, a VVT or CPS mechanism may be adjusted to adjust intake and/or exhaust valve closing and/or opening timing to maintain desired valve timings relative to crankshaft rotation.

At 420, method 400 determines if the length of the traction mechanism is greater than a threshold length. The threshold length may be a length at which compensatory mechanisms may not be adequate to maintain desired engine parameters as the traction mechanism length increases. As such, if the length is greater than the threshold, method 400 proceeds to 422 to output a notification and/or store a diagnostic code (e.g., in memory of the controller) to prompt an operator to service the engine and/or direct an operator to replace the traction mechanism. In this way, as the length of the traction mechanism increases, fuel injection timing and/or valve timing may be adjusted to maintain desired timings, while if the length reaches a threshold beyond which engine operation may degrade, an operator can be prompted to replace the traction mechanism. Method 400 then returns.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for monitoring a traction mechanism drive driving a traction mechanism of an internal combustion engine with a crankshaft, wherein the traction mechanism drive comprises a first driving wheel which is arranged on the crankshaft and a second driven wheel which is arranged on a shaft of an auxiliary assembly, the traction mechanism being guided around the first driving wheel and the second driven wheel, and a movable tensioning device which engages in a force-loaded manner into the traction mechanism and loads the traction mechanism with tensile forces along its longitudinal axis, the method comprising:
   determining a position of the movable tensioning device relative to the traction mechanism drive using measuring technology;
   determining an actual length $L_{AS'}$ of the traction mechanism computationally using the position of the movable tensioning device which was determined using measuring technology;
   determining a length change $\Delta L$ with respect to a predefinable setpoint length $L_{AS}$ computationally using the computationally determined actual length $L_{AS'}$; and
   adjusting one or more operating parameters based on the length change.

2. The method as claimed in claim 1, wherein the position of the movable tensioning device relative to the traction mechanism drive is determined in a contactless manner.

3. The method as claimed in claim 1, wherein the position of the movable tensioning device relative to the traction mechanism drive is determined using an electromagnetic sensor.

4. The method as claimed in claim 1, wherein a rotational angle $\sigma_2$ of the second driven wheel is determined computationally using the position of the movable tensioning device and the computationally determined length change $\Delta L$, said rotational angle $\sigma_2$ fixing a length change and specifying an angle the second driven wheel has rotated with respect to the first driving wheel when the traction mechanism drive is at a standstill, while the traction mechanism has experienced the length change $\Delta L$.

5. The method as claimed in claim 4, wherein the traction mechanism drive comprises a third driven wheel which is arranged on a shaft of a further auxiliary assembly, and wherein a rotational angle $\sigma_3$ of the third driven wheel is determined computationally using the position of the movable tensioning device and the computationally determined length change $\Delta L$, said rotational angle $\sigma_3$ fixing a length change and specifying an angle the third driven wheel has rotated with respect to the first driving wheel when the traction mechanism drive is at a standstill, while the traction mechanism has experienced the length change $\Delta L$.

6. The method as claimed in claim 5, wherein the traction mechanism drive comprises a fourth driven wheel which is arranged on a shaft of a further auxiliary assembly, wherein a rotational angle $\sigma_4$ of the fourth driven wheel is determined computationally using the position of the tensioning device and the computationally determined length change $\Delta L$, said rotational angle $\sigma_4$ fixing a length change and specifying an angle the fourth driven wheel has rotated with respect to the first driving wheel when the traction mechanism drive is at a standstill, while the traction mechanism has experienced the length change $\Delta L$.

7. The method as claimed in claim 5, wherein the shaft of the auxiliary assembly includes a shaft of an injection pump, said shaft driven by the second driven wheel.

8. The method as claimed in claim 7, wherein adjusting an operating parameter includes adjusting the injection pump based on the computationally determined rotational angle $\sigma_2$ of the second driven wheel.

9. The method as claimed in claim 8, wherein the computationally determined rotational angle $\sigma_2$ of the second driven wheel is used in order to adapt an injection start and/or an injection duration of an injection which is to be carried out by the injection pump.

10. The method as claimed in claim 5, wherein the shaft of the auxiliary assembly includes a shaft of a valve gear which comprises at least one camshaft, said shaft driven by the second driven wheel.

11. A method, comprising:
  determining a length of a traction mechanism based on a position of a tensioning device engaged with the traction mechanism; and
  adjusting a fuel injection pump based on the length of the traction mechanism, the traction mechanism transferring rotational movement of a first driving wheel to a second driven wheel, the first driving wheel coupled to a crankshaft of an engine, the second driven wheel coupled to the fuel injection pump.

12. The method of claim 11, wherein adjusting the fuel injection pump comprises adjusting a component of the fuel injection pump to maintain fuel injection timing at a designated crankshaft angle even as the length of the traction mechanism changes.

13. The method of claim 12, wherein adjusting the component of the fuel injection pump comprises adjusting a cam wheel of the fuel injection pump.

14. The method of claim 11, wherein adjusting the fuel injection pump based on the length of the traction mechanism comprises determining a rotational angle of the second driven wheel relative to the first driving wheel based on the length and adjusting the fuel injection pump based on the rotational angle.

15. The method of claim 11, wherein determining the length of the traction mechanism based on the position of the tensioning device comprises measuring the position of the tensioning device based on a signal output from a sensor and determining the length based on the measured position.

* * * * *